(12) United States Patent
Yu et al.

(10) Patent No.: US 12,257,208 B2
(45) Date of Patent: Mar. 25, 2025

(54) BOX FOR DRUG MANAGEMENT AND RECYCLE

(71) Applicant: ZHEJIANG UNIVERSITY, Zhejiang (CN)

(72) Inventors: Hong Yu, Zhejiang (CN); Xin Yu, Zhejiang (CN); Hongyuan Lv, Zhejiang (CN); Zihao Huang, Zhejiang (CN)

(73) Assignee: ZHEJIANG UNIVERSITY

( * ) Notice: Subject to any disclaimer, the term of this patent is extended or adjusted under 35 U.S.C. 154(b) by 313 days.

(21) Appl. No.: 18/155,106

(22) Filed: Jan. 17, 2023

(65) Prior Publication Data
US 2023/0320931 A1    Oct. 12, 2023

(30) Foreign Application Priority Data

Apr. 6, 2022    (CN) .......................... 202210357173.3

(51) Int. Cl.
*A61J 1/03*    (2023.01)
*A61J 7/00*    (2006.01)

(52) U.S. Cl.
CPC .............. *A61J 1/03* (2013.01); *A61J 7/0007* (2013.01); *A61J 2200/70* (2013.01); *A61J 2200/74* (2013.01); *A61J 2205/60* (2013.01)

(58) Field of Classification Search
CPC ........ A61J 1/03; A61J 7/0007; A61J 2200/70; A61J 2200/74; A61J 2205/60; A61J 1/1437; A61J 1/05; A61J 1/00; Y02W 30/10; G06F 21/32; G06F 21/34
See application file for complete search history.

(56) References Cited

U.S. PATENT DOCUMENTS

| | | | | |
|---|---|---|---|---|
| 7,562,025 | B2* | 7/2009 | Mallett | B07C 5/34 |
| | | | | 209/702 |
| 8,019,471 | B2* | 9/2011 | Bogash | G07F 9/026 |
| | | | | 700/242 |
| 2003/0125836 | A1* | 7/2003 | Chirnomas | G07F 9/02 |
| | | | | 700/236 |
| 2005/0049747 | A1* | 3/2005 | Willoughby | G07F 11/68 |
| | | | | 700/232 |
| 2005/0080520 | A1* | 4/2005 | Kline | B65F 1/0006 |
| | | | | 701/1 |
| 2006/0161296 | A1* | 7/2006 | Shoenfeld | G07F 11/64 |
| | | | | 700/242 |

(Continued)

*Primary Examiner* — Michael Collins
(74) *Attorney, Agent, or Firm* — Lambert Shortell & Connaughton; David J. Connaughton, Jr.; Justin P. Tinger (57) ABSTRACT

A box for drug management and recycle is provided, which includes a drug box body, a camera device, a card-swiping device, a display device, a processor, and a power supply. A RFID detection device and electronic locks are arranged in the recycle box. A wireless communication module, an early warning module and a processing module are arranged in the processor, and the processor is wirelessly connected to a server terminal. The acquisition and return of the drugs can be jointly completed through face recognition and card-swiping recognition, and can be specified to an individual according to the obtained employee number and other information, thus facilitating the strict management of drug and achieving the recycle of unwanted drug. Therefore, the recycle box has a broad clinical prospect.

14 Claims, 3 Drawing Sheets

(56) References Cited

U.S. PATENT DOCUMENTS

2007/0010910 A1* 1/2007 Pinney .................... G07F 9/026
  700/231
2014/0244033 A1* 8/2014 Ucer ..................... A61J 7/0084
  700/237
2016/0324727 A1* 11/2016 Waugh ................... G16H 20/13

* cited by examiner

BOX FOR DRUG MANAGEMENT AND RECYCLE

CROSS-REFERENCE TO RELATED APPLICATION

This patent application claims the benefit and priority of Chinese Patent Application No. 202210357173.3 entitled "BOX FOR DRUG MANAGEMENT AND RECYCLE" filed on Apr. 6, 2022, the disclosure of which is incorporated by reference herein in its entirety as part of the present application.

TECHNICAL FIELD

The present disclosure relates to the technical field of medical devices, and in particular relates to a box for drug management and recycle

BACKGROUND

Opioids, which are alkaloids extracted from the opium poppy plant and in-vitro and in-vivo derivatives thereof, may interact with central specific receptors to relieve pain, mainly including analgesics such as morphine, codeine, dihydrocodeine, hydromorphone, oxycodone, fentanyl, sufentanil, remifentanil and pethidine. And, the opioids are commonly used in patients for moderate and severe pain treatment, anesthesia in the perioperative period and the like. However, the opioids may lead to stupor, coma and respiratory depression at high doses, and may cause patient's body tolerance and addictive change of nerves at repeated use, leading to physical, psychological and social harms. Therefore, as a controlled substance, the opioids must be strictly controlled in clinical use, including precisely mastering the taking amount, the use purpose and the use condition, and pinpointing the individual.

The Department of Anesthesiology is the clinical department with the highest consumption of opioids. Currently, the Department of Anesthesiology routinely receives a corresponding number of opioids from the drug administrator according to the day's surgical amount and medical order, and then returns the remaining drugs and empty drug bottles after the day's surgery, and completes personal registration and records of drug use. However, such method employs manual drug management, which is not conducive to the fine control of the acquisition and return of opioids, but also causes waste of unwanted drug.

SUMMARY

The technical problem to be solved by the present disclosure is to provide a box for drug management and recycle. The acquisition and return of opioids can be jointly completed through face recognition and card-swiping recognition, and can be specified to an individual according to the obtained employee number, thus facilitating the strict management of opioids and achieving the recycle of unwanted opioids.

The present disclosure solves the technical problem using the following technical solutions.

A box for drug management and recycle includes a drug box body, a camera device, a card-swiping device, a display device and a processor. The drug box body includes a housing, a drug acquisition layer and a drug recycle layer. Each of the drug acquisition layer and the drug recycle layer is of a drawer type structure. The drug acquisition layer includes a drug outlet, a cutter, a conveyor belt, a drug bottle storage device and a radio frequency identification (RFID) detection device; the drug outlet is formed in a drawer panel of the drug acquisition layer, the cutter is arranged at the drug outlet inside the drug acquisition layer, the conveyor belt is transversely arranged inside the drug acquisition layer, the drug bottle storage device is arranged on the conveyor belt, and the RFID detection device includes radio frequency tags and a reader, each of the radio frequency tags is arranged on a corresponding one of drug bottles in the drug bottle storage device, and the reader is configured to obtain product information stored in the radio frequency tags and is connected to the processor. The drug recycle layer includes drug recycle ports, drug recycle bags and first weight sensors; the drug recycle ports are formed in a drawer panel of the drug recycle layer, the drug recycle bags are arranged inside the drug recycle layer, each of the drug recycle bags is connected to a corresponding one of the drug recycle ports, and each of the first weight sensors is arranged below a corresponding one of the drug recycle bags. The display device is arranged on the housing at a left side of both the drug acquisition layer and the drug recycle layer. The camera device and the card-swiping device are both arranged above the display device. And the processor is connected to each of the display device, the camera device and the card-swiping device.

In some embodiments, the drug acquisition layer may further include a fixing support which is arranged inside the drug acquisition layer and connected to the conveyor belt so as to support the conveyor belt.

In some embodiments, the drug acquisition layer may further include a bottle-cap collecting device which is arranged at a side, close to the drawer panel, inside the drug acquisition layer, and the bottle-cap collecting device may be located below the conveyor belt and the cutter.

In some embodiments, the drug acquisition layer may further include magnetic pressing blocks. The drug bottle storage device may include multiple drug bottle cells, and each of the magnetic pressing blocks may be arranged in a corresponding one of the multiple drug bottle cells.

In some embodiments, the drug acquisition layer may further include second weight sensors. Each of the second weight sensors may be arranged in a corresponding one of the multiple drug bottle cells for detecting weight of a respective one of the drug bottles.

In some embodiments, the drug acquisition layer may further include an indicator light which is arranged on the drawer panel of the drug acquisition layer and connected to the processor.

In some embodiments, the box for drug management and recycle may further include electronic locks. The electronic locks may be respectively arranged on the drawer panel of the drug acquisition layer, the drawer panel of the drug recycle layer as well as portions of the housing which are adjacent to the drawer panel of the drug acquisition layer and the drawer panel of the drug recycle layer. The electronic locks may be connected to the processor. The drug acquisition layer and the drug recycle layer may be both fixed to the drug box body by the electronic locks.

In some embodiments, the processor may include a wireless communication module, an early warning module and a processing module, and is wirelessly connected to a server. The wireless communication module may be configured to connect modules of the box for drug management and recycle to the server. The early warning module may be configured to determine and remind whether each of the drugs in the drug bottles is completely extracted and whether the number of returned empty drug bottles is consistent with the number of ones of the drugs which are extracted.

In some embodiments, the box for drug management and recycle may further include a report button which is arranged on the drug box body.

In some embodiments, the box for drug management and recycle may further include a battery and a charging interface. The battery may be configured to power the box for drug management and recycle. And the charging interface may be configured to connect with a power supply to charge the battery and power the box for drug management and recycle.

By adopting the technical solution above, embodiments of the present disclosure can achieve the following technical effects: the acquisition and return of the drugs can be jointly completed through face recognition and card-swiping recognition, and can be specified to an individual according to the obtained employee number, thus facilitating the strict management of drugs and achieving the recycle of unwanted drug. Therefore, the recycle box has a broad clinical prospect.

The above description is only an outline of the technical solution of embodiments of the present disclosure. To make the technical means of the present disclosure more clearly, the technical solution can be implemented in accordance with the contents of the description. Preferred embodiments of the present disclosure are provided below in conjunction with the accompanying drawings to make the above and other objectives, features and advantages of the present disclosure more apparently and understandably.

DETAILED DESCRIPTION OF THE EMBODIMENTS

To further explain the technical means and efficacy of the present disclosure to achieve the intended inventive objectives, the embodiments of the present disclosure are described in detail below, examples of which are illustrated in the accompanying drawings. Here, the same or similar reference numerals refer to the same or similar elements or elements having the same or similar function throughout. The described embodiments below are only part rather than all of the embodiments of the present disclosure. On the basis of the embodiments of the present disclosure, all other embodiments acquired by those of ordinary skill in the art without making inventive efforts fall within the scope of protection of the present disclosure. While the technical means and efficacy taken to achieve the intended objectives of the present disclosure will be more fully and specifically understood by the description of the specific embodiments, the accompanying drawings are provided only for the purpose of reference and description and are not intended to limit the present disclosure.

Figure 1:
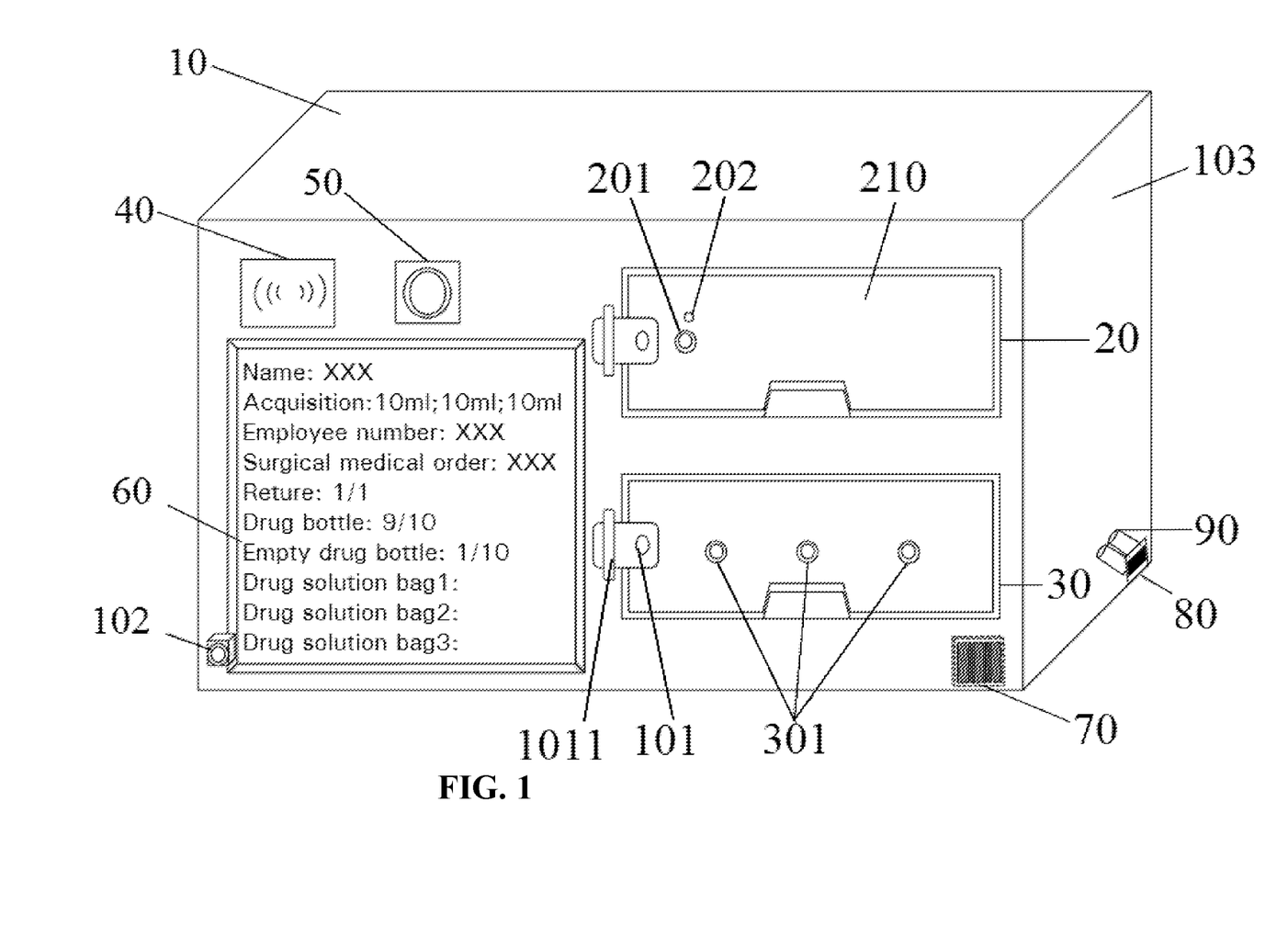
FIG. 1 is a structure diagram of a box for drug management and recycle in accordance with embodiments of the present disclosure.
Figure 2:
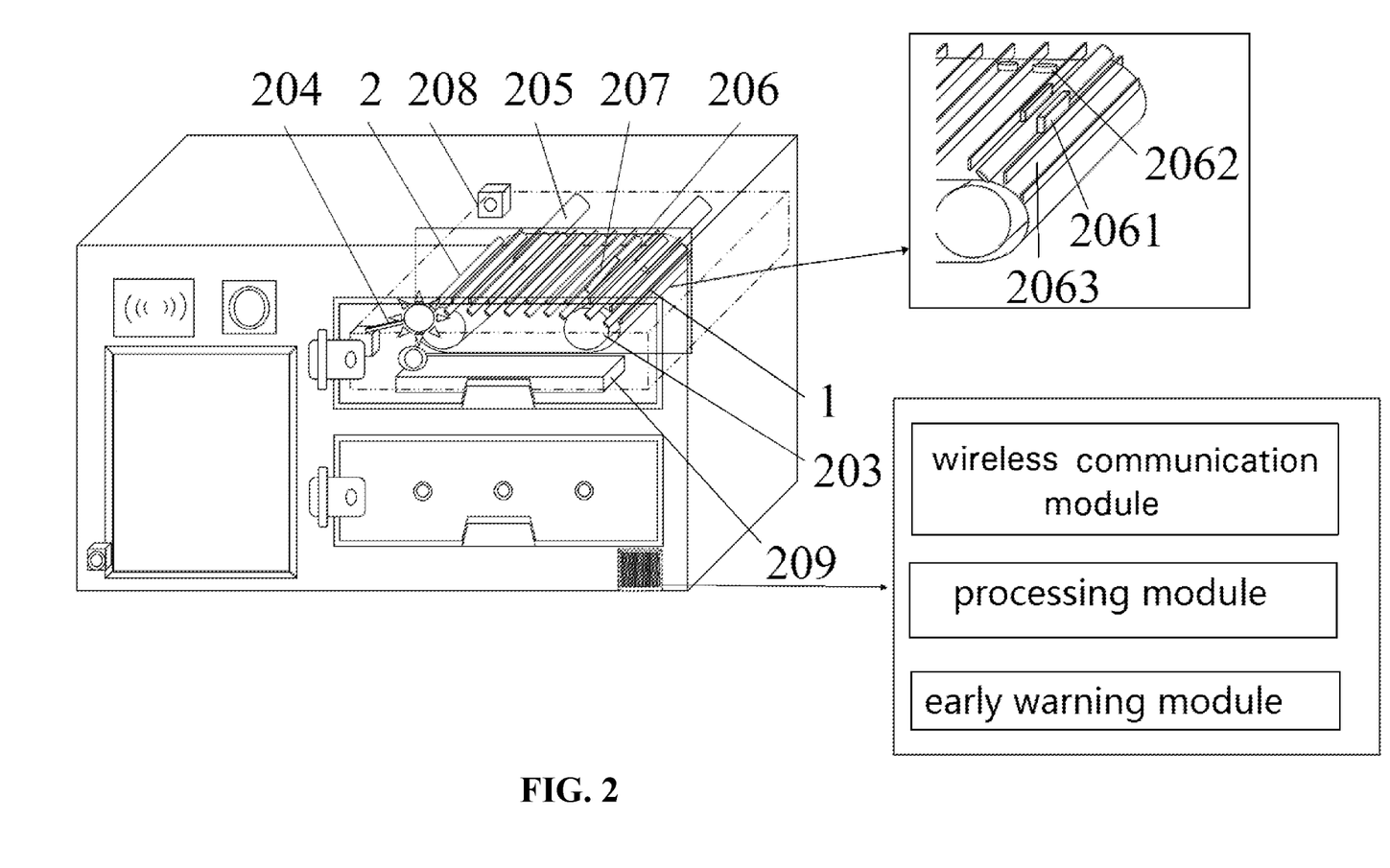
FIG. 2 is a structure diagram of a drug acquisition layer in the box for drug management and recycle in accordance with the embodiments of the present disclosure.
Figure 3:
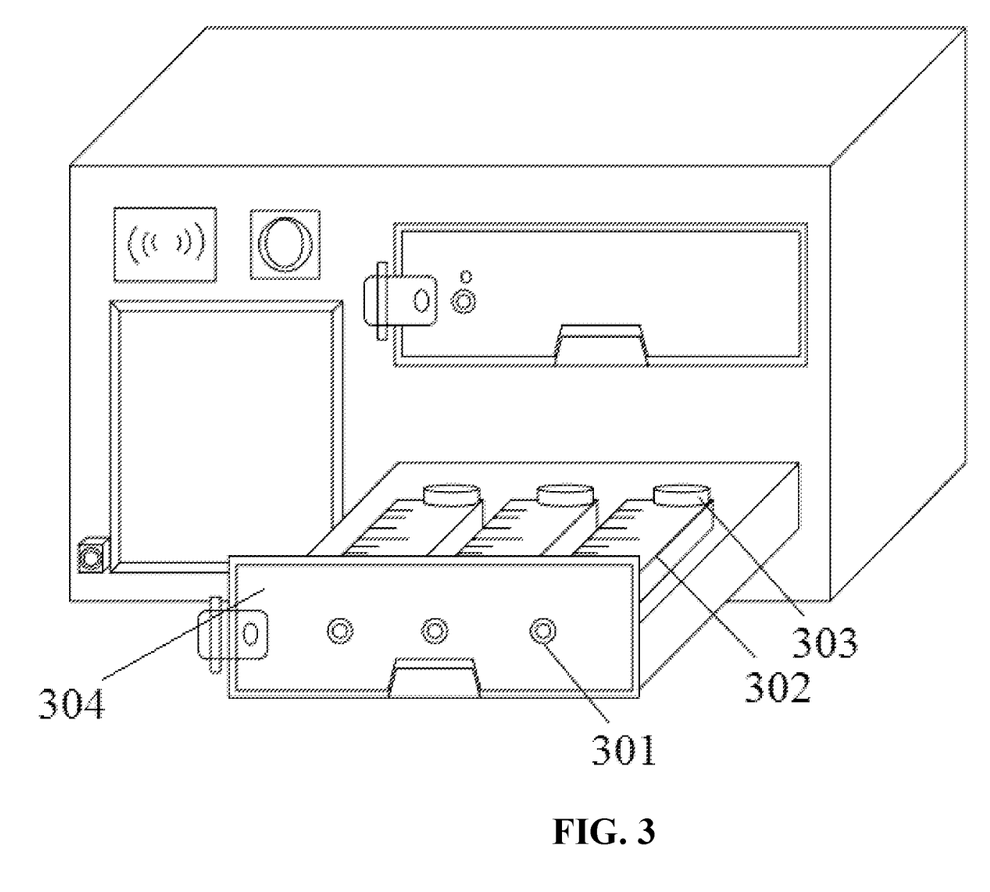
FIG. 3 is a structure diagram of a drug recycle layer in the box drug management and recycle in accordance with the embodiments of the present disclosure.

FIG. 1 is a structure diagram of a box for drug management and recycle in accordance with an embodiment of the present disclosure. FIG. 2 is a structure diagram of a drug acquisition layer in a box for drug management and recycle in accordance with an embodiment of the present disclosure. FIG. 3 is a structure diagram of a drug recycle layer in a box for drug management and recycle in accordance with an embodiment of the present disclosure.

Referring to the present disclosure with reference to FIGS. 1 to 3.

As shown in FIG. 1, a box for drug management and recycle provided by the embodiment includes a drug box body 10, a card-swiping device 40, a camera device 50, a display device 60, and a processor 70.

Hereinafter, the box for drug management and recycle takes a box for opioid management and recycle as an example, which includes a box body 10, a camera 50, a card-swiping area 40, a display screen 60, a processor 70 and a power supply 90. The box for opioid management and recycle further includes a drug control system for controlling the movement of a drug bottle 1, and a drug extraction system for controlling the acquisition amount of the drug. A RFID detection device and electronic locks 101 are further arranged in the opioid management and recycle box. A wireless communication module, an early warning module and a processing module are arranged in the processor, and the processor is wirelessly connected to a server terminal (not shown in figure).

Further, the drug box body 10 includes a housing 103, a drug acquisition layer 20 and a drug recycle layer 30, and each of the drug acquisition layer 20 and the drug recycle layer 30 is of a drawer type structure. The drawer type structure includes a drawer panel, a drawer side plate, a drawer rear plate, and a drawer bottom plate.

Further, the drug acquisition layer 20 includes a drug outlet 201, a conveyor belt 203, a cutter 204, a drug bottle storage device 206, and a radio frequency recognition detection device 207. The drug outlet 201 is formed in the drawer panel 210 of the drug acquisition layer 20. The cutter 204 is arranged at the drug outlet inside the drug acquisition layer 20. The conveyor belt 203 is transversely arranged inside the drug acquisition layer 20. The drug bottle storage device 206 is arranged on the conveyor belt 203.

Further, the drug recycle layer 30 includes a drug recycle port 301 and a drug recycle bag 302.

Exemplarily, the drug box body 10 of the opioid management box is a cabinet body of a two-layer drawer type structure, which can be formed by assembling and welding sheet metal parts (the sheet metal parts are made of flexible materials with chips, and in other embodiments, the box body can also be made of wood, plastic, glass and the like). The first layer of the drawer is a drug acquisition layer 20 for placing the whole bottle of opioid (generally, according to the standard that ten bottles of opioid are packaged in one drug box) based on the current required anesthesia, and placing empty opioid drug bottles 2. The second layer of drawer is a drug recycle layer 30 for recycling unwanted opioids. Acrylic signboards are arranged in the center of the drawer surface of each of the drug acquisition layer 20 and the drug recycle layer 30. Ten drug cells each matched with the specification of the single drug bottle are arranged in the first layer of drawer for storing the drug bottles 1 in which the drug is stored, and storing used empty drug bottles 2. A drug solution bag with scales is arranged in the second layer of drawer for recycling the drug solution which is diluted and used but is not used up.

Further, the RFID detection device includes radio frequency tags 207 and a reader 208. The radio frequency tags 207 are arranged on the drug bottle 1 in the drug bottle storage device 206, and the reader 208 is configured to obtain product information stored in the radio frequency tags 207 and is connected to the processor 70.

Exemplarily, the radio frequency identification detection device 207 (RFID detection device) includes the radio frequency tags 207, the reader 208, and a central information system which are used for the identification of the number of drug bottles in each layer of drawer and information binding between a person (to acquire her/his drugs) and the drugs acquired by the person. The radio frequency tag 207 includes a coupling element and a chip. Each tag has a unique electronic code attached to the corresponding drug bottle 1 for identification. The tag receives a radio frequency signal sent by the reader 208, and sends out the product information stored in the chip by virtue of the energy obtained from the induced current. The reader 208 is configured to read and decode the information and then to send the decoded information to the central information system for information processing, including binding a user with the information of the drug acquired by the user, and transmitting a binding signal to a server terminal, wirelessly. Meanwhile, the number of drug bottles 1 in the drug acquisition layer 20 is identified, and the signal for the number is wirelessly transmitted to the terminal and is converted into an image signal to be displayed on the display screen 60 in a form of "remaining number/total number: 10/10".

Further, the drug acquisition layer 20 further includes a fixing support 205. The fixing support 205 is arranged inside the drug acquisition layer 20 and connected to the conveyor belt 203 so as to support the conveyor belt 203.

The fixing support 205 is arranged at the drawer rear plate and then is connected to the conveyor belt 203 so as to support the conveyor belt 203 transversely placed inside the drug acquisition layer 20.

Further, a bottle-cap collecting device 209 is provided. The bottle-cap collecting device 209 is arranged at the side, close to the drawer panel 210, inside the drug acquisition layer 20, and the bottle-cap collecting device 209 is located below the conveyor belt 203 and the cutter 204.

Exemplarily, the bottle-cap collecting device 209, such as a bottle-cap collecting box, is placed inside the drawer surface (i.e., the drawer panel) of the drug acquisition layer 20 and is located below the conveyor belt 203 and the cutter 204 for receiving the bottle caps that are cut. After the cap of the drug bottle 1 is cut by the cutter 204, the bottle cap directly falls to the bottle-cap collecting box. The bottle-cap collecting box is detachably installed at the bottom of the drug acquisition layer 20, thus when the drug bottle administrator needs to discard the bottle caps, the bottle caps can be taken out from the drug acquisition layer 20 by dismounting the bottle-cap collecting box, and then can be poured into a medical waste recycle bin.

Further, the drug acquisition layer 20 further includes magnetic pressing blocks 2061. The drug bottle storage device 206 includes multiple drug bottle cells 2063, and each of the magnetic pressing blocks 2061 is arranged in a corresponding one of the multiple drug bottle cells.

Exemplarily, when a drug bottle is placed into the corresponding cell, the magnetic pressing block 2061 clamps the drug bottle to prevent the drug bottle from displacing.

Further, the drug acquisition layer 20 further includes weight sensors 2062. Each of the weight sensors 2062 is arranged inside a corresponding one of the multiple drug bottle cells for detecting the weight of the drug bottle.

Exemplarily, when a syringe and other devices extract the drug in the drug bottle through the drug outlet 201, the weight sensor is configured to detect the weight of the drug bottle in real time, so as to verify whether the drugs in the drug bottle are extracted completely or not.

Further, the drug acquisition layer 20 further includes an indicator light 202. The indicator light 202 is arranged on the drawer panel 210 of the drug acquisition layer 20 and is connected to the processor 70.

Exemplarily, the indicator light 202 is arranged above the drug outlet 201 on the drawer panel 210 of the drug acquisition layer 20. After the cap of the drug bottle is cut by the cutter 204 completely (the box body stops moving), the indicator light 202 turns green. When the box body moves (the conveyor belt 203 moves forwards and the cutter 204 is started), the indicator light 202 is in a standby state, and the indicator light 202 is red.

Further, the drug recycle layer 30 includes drug recycle ports 301, drug recycle bags 302 and weight sensors 303. The drug recycle ports 301 are formed in a drawer panel 304 of the drug recycle layer 30, the drug recycle bags 302 are arranged inside the drug recycle layer 30 and are connected to the drug recycle port 301, and the weight sensors 303 are arranged below the drug recycle bag 302.

Exemplarily, the drawer surface (i.e., the drawer panel) of the drug recycle layer 30 is provided with three drug recycle holes in different specifications (i.e., the drug recycle ports 301) for connecting 5 ml barrel, 10 ml barrel and 20 ml barrel respectively. Specifically, the drug recycle port 301 is provided with a circular check valve, a magnetic device (such as a electronic lock) may be provided on the drawer surface of the drug recycle layer 30. The magnetic device is configured for cooperating with the circular check valve, and the magnetic device may be controlled by the server terminal (that is, the valve can be opened only after receiving an opening command). The three drug recycle holes are respectively connected to the corresponding drug solution recycle bags for recycling remaining drug solutions of different concentrations (with different dilutions at the time of use). The weight sensor 303 is arranged below the drug recycle bag 302, and a weight signal is wirelessly transmitted to the processing module. Therefore, the weight signal can be converted into a digital signal based on a preset program, a signal for recycled weight is calculated according to the program, and thus an image signal is formed for display. The maximum available weight of the drug solution recycle bag is preset. So, after the maximum available weight is reached, alarm information can be output on the display screen 60 to remind the user not to input the drug solution, and the alarm information is reported to a drug administrator.

Further, the display device 60 is arranged at a portion of the housing 103 which is at the left side of the drug acquisition layer 20 and the drug recycle layer 30.

Further, the camera device 50 and the card-swiping device 40 are both arranged above the display device 60.

Further, the processor 70 is connected to the display device 60, the camera device 50 and the card-swiping device 40 respectively.

Exemplarily, the camera device 50, such as a camera, is located above the display screen, which is mainly represented as a face recognition sensor. The face recognition sensor is configured to collect a user's face image and to analyze facial features, so as to form a face recognition signal. The face recognition signal is uploaded to the server terminal through the wireless communication module. After the face recognition signal is matched with the employee information database, personal information of the successfully matched staff (that is, employee number, the daily amount of the surgical, the day's surgical medical order and the like) is transmitted to an information verification module through the wireless communication module.

Exemplarily, the card-swiping device 40, such as a card-swiping area, is located above the display screen, and is mainly represented as a RFID wireless card reader. The RFID wireless card reader is configured to identify a particular target through a radio signal, to read and write related data, and then to upload the related data to the server terminal. After the related data is matched with an employee information database, the personal information of the successfully matched employee (name, employee number, the daily amount of the surgical, the day's surgical medical order and the like) is transmitted to the information verification module through the wireless communication module, and the personal information consistent with the face recognition information is converted into an image signal to be transmitted to the display screen.

Further, the box for drug management and recycle further includes electronic locks 101. The electronic locks 101 are respectively arranged on the drawer panel 210 of the drug acquisition layer 20 and the drawer panel 304 of the drug recycle layer 30, and portions of the housing 103 which are adjacent to the drawer panel of the drug acquisition layer 20 and the drawer panel of the drug recycle layer 30, and the electronic locks 101 are connected to the processor 70. The drug acquisition layer 20 and the drug recycle layer 30 are both fixed to the drug box body 10 by the electronic locks 101.

Exemplarily, the electronic locks 101 each includes an electronic key 1011 arranged beside each layer of drawer (i.e., each of the drawer panels of the drug acquisition layer 20 and the drug recycle layer 30) and connected to the processor 70. In the standby state, the electronic key 1011 is in a close mode (the key is red), at this time, the electronic locks 101 are connected to the housing 103 of the box body with the drug acquisition layer 20 and the drug recycle layer 30 respectively. After the personal information of the user is successfully verified, the processor 70 is configured to control the electronic key 1011 in an open state (the key turns green), and the electronic key (i.e., the digital password) 1011 corresponding to the drawer (i.e., the drug acquisition layer 20 or the drug recycle layer 30) is pressed to open the corresponding electronic lock 101. Electronic keys 1011 of the two layers can only be opened by swiping a card by the drug administrator for organizing the opioid recycle management box, including taking out and checking the number of empty drug bottles 2, placing new drug bottles therein, and recycling unwanted drug solution.

Further, the box for drug management and recycle further includes a report button 102. The report button 102 is arranged on the drug box body 10.

Exemplarily, when the user finds out that the box for opioid management and recycle detects errors (e.g., wrong drug information displayed on the display screen, wrong drug acquisition amount and the like), the report button 102 can be clicked to transmit an alarm signal to the server terminal and to contact the drug administrator. The alarm signal is converted into an image signal at the server terminal, and then is displayed on the display screen in a form of "system error".

Further, the processor 70 includes a wireless communication module, an early warning module and a processing module, and the processor 70 is wirelessly connected to a server. The wireless communication module is configured to connect various modules of the box for drug management and recycle to the server. The early warning module is configured to determine and remind whether the drugs in the drug bottle is completely extracted or not; and whether the number of the returned empty drug bottles is consistent with the number of the acquired drug bottles or not.

Exemplarily, the wireless communication module is configured to construct a signal transmission channel so as to connect various modules of the box body to the server terminal.

Exemplarily, the early warning module is configured to determine and remind whether the drugs in the drug bottle has been completely extracted or not; and whether the number of the returned empty drug bottles is consistent with the number of the acquired drug bottles or not. When the number of the returned drug bottles is inconsistent with the number of the acquired drug bottles, or the drug in the drug bottle has not been completely extracted, a trigger condition is reached, then a signal is transmitted and stored at the terminal and then is converted into an image signal at the terminal. Thus, the image signal is displayed on the display screen in a form of "return number/acquisition number: 3:4", "please extract the drug!".

Further, the opioid management box further includes a battery 90, which is a miniature battery, and can be connected to the power supply through a USB charging interface 80 for electricity storage. The power supply is used preferentially when the power supply is connected to the box via the USB charging interface.

The box for opioid management and recycle in the embodiments is further loaded with a drug control system and a drug extraction system. The acquisition amount of the drug is confirmed through the drug control system, and the drug extraction system is configured to deliver the drug of the corresponding acquisition amount to the user.

Exemplarily, the drug control system includes an input module, a terminal calculation module, and a confirming module. The input module is located at the display screen and configured to receive an input signal including the information of required drug solution dilution concentration and drug dosage input into the display screen by the user. And, the input signal is transmitted to the server terminal through the wireless communication module. The terminal calculation module is configured to calculate multiple drug dispensing options through a preset program, including the number of required drug bottles, the number of syringes containing normal saline in corresponding specifications and how to extract the drug. The drug dispensing options are wirelessly transmitted to the display screen, and the user can select a proper scheme according to the existing syringe. The confirming module is configured to receive a confirming signal input into the display screen by the user, and the confirming signal is wirelessly transmitted to the server terminal. The server terminal is configured to generate a start signal and a termination signal, so as to control the drug extraction system to extract from the drug bottle.

Exemplarily, the drug extraction system includes a drug outlet 201, a conveyor belt 203, a weight sensor 2062, a cutter 204, a start module, a termination module, and an indication module. The drug outlet 201 is formed in the leftmost end of the first layer of drawer (i.e., the drug acquisition layer 20), specifically presenting as a circular check valve having a diameter of 1 cm. An interface of the syringe may enter the box through this outlet. The conveyor belt 203 is transversely placed and operates anticlockwise. Ten drug bottle cells each matched with the specification of the single drug bottle are arranged on the conveyor belt 203, and each cell contains a drug bottle placed by the drug administrator. And, the start module is configured to receive a start signal transmitted by the server terminal and to start the conveyor belt 203 to move forward by one unit (at the moment, the opening of the drug bottle directly faces the drug outlet 201). The cutter 204 is placed at the inner side of the drug outlet 201 and configured to cut the drug bottle to form a drug bottle opening to facilitate extracting. An infrared sensor, a processing module, a cutting blade, an electric turbine and the like are arranged in the box for drug management and recycle. When the drug bottle directly faces the drug outlet 201, a drug bottle signal is received by the infrared sensor and then is transmitted to the processing module. The processing module, by combining the drug bottle signal and the starting signal, controls the electric turbine to drive the cutting blade to cut the drug bottle. After the cutting blade touches a travel switch, a travel switch instruction is received by the processing module so as to control the electric turbine to rotate reversely, thus enabling the cutter 204 to return to the original position. The weight sensor 2062 is configured to receive a weight signal of a drug bottle in the corresponding cell, and the signal is transmitted to the terminal through the wireless communication module. When the drug solution in the drug bottle is extracted completely, the sensor is configured to receive and transmit a weight change to the terminal. The start module is controlled by the terminal to start the conveyor belt 203 to further move forward by one unit, thus performing the circulation. A termination module is configured to receive a termination signal transmitted by the terminal. When the operation number of the conveyor belt 203 reaches the required number of drug bottles, the termination module is started to terminate the circulation. A indication module specifically presents that the indicator light 202 is arranged above the drug outlet 201. After the cap of the drug bottle is cut by the cutter 204 completely (the box body stops moving), the indicator light 202 is controlled by the terminal to turn green. When the box body moves (the conveyor belt 203 moves forwards and the cutter 204 is started), the indicator light 202 is controlled by the terminal to be in a standby state, and the indicator light 202 is red.

The use method of the opioid management and recycle box includes the following steps: a drug acquisition step, a drug return step, and a step of collating the drug box by the drug administrator. The steps above are described in detail below.

Specifically, the drug acquisition step includes the following steps.

In Step one, the information of the employee is identified by performing card-swiping operation and face recognition through the card-swiping device 40 and the camera device 50 so as to enter the system. Personal information is shown on a display screen 60, and the personal information is verified. And, the following Steps two to five are allowed only after the personal information is successfully verified.

In Step two, the day's surgical information and electronic prescriptions are verified by the user, the drug acquisition amount (including dilution concentration and required dosage) is input on the display screen according to the medical order.

In Step three, one of several drug dispensing options prompted on display screen is selected according to the condition of the syringe owned by the user, and a label "confirm" is clicked by the user.

In Step four, after an indicator light above a drug outlet 201 turns green, the syringe with the corresponding specification is placed at the drug outlet 201 to align with an opening of a drug bottle so as to extract the drug. After the drug is completely extracted, a conveyor belt 203 in the drug box waits to operate (when the drug box operates, the indicator light 202 is red). After the indicator light turns green, another drug is further extracted. The drug is extracted in this way until the operation of the drug box is finished (the drug in all drug bottles needs to be completely extracted). Then the number of drug bottles displayed on the display screen is checked to determine whether it is consistent with the actual number of the used drug bottles or not. And, the number of empty drug bottles 2 displayed on the display is checked to determine whether it is consistent with the actual number of the used drug bottles or not. The data is automatically uploaded to the drug administrator after verification of correctness.

In Step five, if the number of the drug bottles is not consistent, a report button 102 may be clicked, and a drug administrator is notified by an early warning module to clarify the reason.

Specifically, the drug return step includes the following steps.

In Step one, the information of the employee is identified by performing card-swiping operation and face recognition to enter the system. Personal information is shown on a display screen, and the personal information is verified.

In Step two, the day's surgical information and electronic prescriptions are checked, and the recycled dosage of the drug is clarified according to the surgery records.

In Step three, a drug inlet of a drug recycle layer 30 is opened, and the remaining drug solution is injected into the drug solution recycle bag according to the specification.

In Step four, the dosage of the remaining drug solution (the drug return amount is confirmed according to a weight difference value before and after drug return detected by the weight sensor 303) is verified, and the data is automatically uploaded to the drug administrator after verifying that there is no difference.

In Step five, if the user confirms that the displayed drug solution return dosage is inconsistent with the actual drug solution return amount through the display screen, clicks the report button 102, and the drug administrator is notified by the early warning module to clarify the reason.

Specifically, the step of collating the drug box by the drug administrator includes the following steps.

In Step one, the information of the employee is identified by performing card-swiping and face recognition and then the employee may enter the system. Personal information is shown on a display screen, and the personal information is verified.

In Step two, the electronic key for the first layer is clicked to open the first layer. The number of drug bottles displayed on the display is checked to determine whether it is consistent with the actual number of drug bottles in the drug box or not. And, the number of the empty drug bottles 2 displayed is checked to determine whether it is consistent with the number of the actual empty drug bottles 2 in the drug box or not. After the verification of correctness, the empty drug bottles 2 in the cells are taken out, and new drug bottles are placed in the cells. The information on the display is verified again after closing the first layer.

In Step three, the electronic key for the second layer is clicked to open the second layer. The recycled drug amount displayed on the display is checked to determine whether it is consistent with the drug recycle amount in the drug solution bag or not. After the verification of correctness, the drug solution bag is taken out, and a new and empty drug solution bag is placed, and the information on the display is verified again after closing the second layer.

The box for drug management and recycle has the following beneficial effects. The box body is a cabinet body of a two-layer drawer type structure. One layer is the drug acquisition layer 20, the other layer is the drug recycle layer 30, and the two layers are both locked by respective electronic locks 101. The drug acquisition layer 20 may automatically confirm the number of drug bottles of the required drug according to the drug acquisition amount, and may provide the corresponding number of drug bottles of drug for the user. A drug solution recycle bag is arranged in the drug recycle layer 30 for facilitating the recycle of the drug solution which is not used up by the user. The box for drug management and recycle disclosed by the present disclosure is scientific and reasonable in structure, safe and convenient to operate, and also humanized in design. Further, this box in the present disclosure is capable of managing the acquisition and return amount of the drug by a computer system, convenient for strict management of the drug, and capable of recycling unwanted drug.

By means of the description of the embodiments above, those skilled in the art may clearly appreciate that embodiments of the present disclosure may be implemented in hardware or by way of software plus a necessary general purpose hardware platform. Based on such understanding, the technical solution of the embodiments of the present disclosure can be embodied in the form of a software product, and the software product can be stored in a non-volatile storage medium (which may be a CD-ROM, a USB flash disk, a mobile hard disk and the like) and includes multiple instructions for enabling a computer (which may be a personal computer, a server, or network equipment and the like) to execute the method described in various implementation scenarios of the embodiments of the present disclosure.

Although the preferred embodiments of the present disclosure have been described in detail above with reference to the accompanying drawings, the present disclosure is not limited to specific details in the above-described embodiments. The above-described embodiments and drawings are exemplary, and the modules or flows in the drawings are not necessarily required to practice embodiments of the present disclosure and are not to be construed as limitations on the present disclosure. Within the scope of the technical idea of the present disclosure, multiple simple modifications and combinations can be made to the technical solution of the present disclosure, and these simple modifications and combinations all belong to the scope of protection of the present disclosure.

What is claimed is:

1. A box for drug management and recycle, comprising a drug box body, a camera device, a card-swiping device, a display device, and a processor, wherein
the drug box body comprises a housing, a drug acquisition layer and a drug recycle layer, each of the drug acquisition layer and the drug recycle layer is of a drawer type structure;
the drug acquisition layer comprises a drug outlet, a cutter, a conveyor belt, a drug bottle storage device, and a radio frequency identification (RFID) detection device; the drug outlet is formed in a drawer panel of the drug acquisition layer, the cutter is arranged at the drug outlet inside the drug acquisition layer, the conveyor belt is transversely arranged inside the drug acquisition layer, the drug bottle storage device is arranged on the conveyor belt, and the RFID detection device comprises radio frequency tags and a reader, each of the radio frequency tags is arranged on a corresponding one of drug bottles in the drug bottle storage device, and the reader is configured to obtain product information stored in the radio frequency tags and is connected to the processor;
the drug recycle layer comprises drug recycle ports, drug recycle bags and first weight sensors; the drug recycle ports are formed in a drawer panel of the drug recycle layer, the drug recycle bags are arranged inside the drug recycle layer, each of the drug recycle bags is connected to a corresponding one of the drug recycle ports, and each of the first weight sensors is arranged below a corresponding one of the drug recycle bags;
the display device is arranged on the housing at a left side of both the drug acquisition layer and the drug recycle layer;
the camera device and the card-swiping device are both arranged above the display device; and
the processor is connected to each of the display device, the camera device and the card-swiping device.

2. The box for drug management and recycle according to claim 1, wherein the drug acquisition layer further comprises a fixing support which is arranged inside the drug acquisition layer and connected to the conveyor belt so as to support the conveyor belt.

3. The box for drug management and recycle according to claim 1, wherein the drug acquisition layer further comprises a bottle-cap collecting device which is arranged at a side, close to the drawer panel, inside the drug acquisition layer, and the bottle-cap collecting device is located below the conveyor belt and the cutter.

4. The box for drug management and recycle according to claim 1, wherein the drug acquisition layer further comprises magnetic pressing blocks;
the drug bottle storage device comprises a plurality of drug bottle cells, and each of the magnetic pressing blocks is arranged in a corresponding one of the plurality of the drug bottle cells.

5. The box for drug management and recycle according to claim 2, wherein the drug acquisition layer further comprises magnetic pressing blocks;
the drug bottle storage device comprises a plurality of drug bottle cells, and each of the magnetic pressing blocks is arranged in a corresponding one of the plurality of the drug bottle cells.

6. The box for drug management and recycle according to claim 3, wherein the drug acquisition layer further comprises magnetic pressing blocks;
the drug bottle storage device comprises a plurality of drug bottle cells, and each of the magnetic pressing blocks is arranged in a corresponding one of the plurality of the drug bottle cells.

7. The box for drug management and recycle according to claim 4, wherein the drug acquisition layer further comprises second weight sensors;
each of the second weight sensors is arranged in a corresponding one of the plurality of drug bottle cells for detecting weight of a respective one of the drug bottles.

8. The box for drug management and recycle according to claim 5, wherein the drug acquisition layer further comprises second weight sensors;
each of the second weight sensors is arranged in a corresponding one of the plurality of drug bottle cells for detecting weight of a respective one of the drug bottles.

9. The box for drug management and recycle according to claim 6, wherein the drug acquisition layer further comprises second weight sensors;

each of the second weight sensors is arranged in a corresponding one of the plurality of drug bottle cells for detecting weight of a respective one of the drug bottles.

10. The box for drug management and recycle according to claim 1, wherein the drug acquisition layer further comprises an indicator light which is arranged on the drawer panel of the drug acquisition layer and connected to the processor.

11. The box for drug management and recycle according to claim 1, wherein the box for drug management and recycle further comprises electronic locks;
the electronic locks are respectively arranged on the drawer panel of the drug acquisition layer, the drawer panel of the drug recycle layer as well as portions of the housing which are adjacent to the drawer panel of the drug acquisition layer and the drawer panel of the drug recycle layer; and the electronic locks are connected to the processor; and
the drug acquisition layer and the drug recycle layer are both fixed to the drug box body by the electronic locks.

12. The box for drug management and recycle according to claim 1, wherein the processor comprises a wireless communication module, an early warning module and a processing module, and is wirelessly connected to a server;
the wireless communication module is configured to connect modules of the box for drug management and recycle to the server;
the early warning module is configured to determine and remind whether each of drugs in the drug bottles is completely extracted or not; and
the early warning module is configured to determine and remind whether a number of returned empty drug bottles is consistent with a number of ones of the drugs which are extracted.

13. The box for drug management and recycle according to claim 1, wherein the box for drug management and recycle further comprises a report button which is arranged on the drug box body.

14. The box for drug management and recycle according to claim 1, wherein the box for drug management and recycle further comprises a battery and a charging interface;
the battery is configured to power the box for drug management and recycle; and
the charging interface is configured to connect with a power supply to charge the battery and power the box for drug management and recycle.

* * * * *